United States Patent
Xin et al.

(10) Patent No.: US 10,928,811 B2
(45) Date of Patent: Feb. 23, 2021

(54) METHOD AND SYSTEM TO MODEL INDUSTRIAL ASSETS USING HETEROGENOUS DATA SOURCES

(71) Applicant: General Electric Company, Schenectady, NY (US)

(72) Inventors: Fuxiao Xin, San Diego, CA (US); Larry Swanson, Laguna Hills, CA (US); Rui Xu, Rexford, NY (US); Morgan Salter, Atlanta, GA (US); Achalesh Pandey, San Ramon, CA (US); Ramu Chandra, Union City, CA (US); Weizhong Yan, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 529 days.

(21) Appl. No.: 15/793,590

(22) Filed: Oct. 25, 2017

(65) Prior Publication Data

US 2019/0121336 A1    Apr. 25, 2019

(51) Int. Cl.
*G05B 23/02* (2006.01)
*F03D 80/50* (2016.01)
(Continued)

(52) U.S. Cl.
CPC ......... *G05B 23/0251* (2013.01); *F03D 80/50* (2016.05); *G05B 19/0428* (2013.01);
(Continued)

(58) Field of Classification Search
CPC ............ G05B 23/0251; G05B 19/0428; G05B 23/0283; F03D 80/50; F05D 2230/80;
(Continued)

(56) References Cited

U.S. PATENT DOCUMENTS

| | | | |
|---|---|---|---|
| 2007/0198215 A1 | 8/2007 | Bonanni et al. | |
| 2011/0020122 A1* | 1/2011 | Parthasarathy | ......... F03D 17/00 416/61 |

(Continued)

OTHER PUBLICATIONS

Xie, Le et al., "Multi-Scale Integration of Physics-Based and Data-Driven Models in Power Systems", Third International Conference on Cyber-Physical Systems, https://dl.acm.org/citation.cfm?id=2223856.2223874, Apr. 17-19, 2012, DOI: 10.1109/ICCPS.2012.21, (pp. 129-137, 9 total pages).

(Continued)

*Primary Examiner* — Cedric Johnson
(74) *Attorney, Agent, or Firm* — Buckley, Maschoff & Talwalkar LLC

(57) ABSTRACT

According to some embodiments, a system and method are provided to model a sparse data asset. The system comprises a processor and a non-transitory computer-readable medium comprising instructions that when executed by the processor perform a method to model a sparse data asset. Relevant data and operational data associated with the newly operational are received. A transfer model based on the relevant data and the received operational data. An input into the transfer model is received and a predication based on data associated with the received operational data and the relevant data is output.

12 Claims, 4 Drawing Sheets

(51) Int. Cl.
*G06N 3/02* (2006.01)
*G05B 19/042* (2006.01)
*G06Q 50/06* (2012.01)

(52) U.S. Cl.
CPC ............ *G06N 3/02* (2013.01); *F05B 2230/80* (2013.01); *F05B 2240/96* (2013.01); *G05B 23/0283* (2013.01); *G06Q 50/06* (2013.01)

(58) Field of Classification Search
CPC ...... F05B 2240/96; G06N 3/02; G06N 20/00; G06Q 50/06; G06F 17/50; G06F 30/00
USPC .......................................................... 703/6
See application file for complete search history.

(56) References Cited

U.S. PATENT DOCUMENTS

| | | | |
|---|---|---|---|
| 2012/0083933 A1 | 4/2012 | Subbu et al. | |
| 2014/0058534 A1* | 2/2014 | Tiwari | G05B 13/04 700/9 |
| 2014/0278241 A1 | 9/2014 | Jiang et al. | |
| 2015/0235150 A1* | 8/2015 | Schmitt | G05B 17/02 705/348 |
| 2016/0084224 A1 | 3/2016 | Tyber et al. | |

OTHER PUBLICATIONS

Zhang, Zijun et al., "Optimization of Wind Power and Its Variability With a Computational Intelligence Approach", IEEE Transactions on Sustainable Energy, http://ieeexplore.ieee.org/abstract/document/6626554/, vol. 05, Issue 01, Jan. 2014, DOI: 10.109/TSTE.2013.2281354, (pp. 228-236, 9 total pages).

Mosleh, Ali "Physics-Based Probabilistic Model Of The Effects Of Ionizing Radiation On Polymeric Insulators Of Electric Cables Used In Nuclear Power Plants", US Department of Energy, https://www.risksciences.ucla.edu/current-projects/2015/9/28/physics-based-probabilistic-model-of-the-effects-of-ionizing-radiation-on-polymeric-insulators-of-electric-cables-used-in-nuclear-power-plants, Sep. 28, 2015, (1 pg).

* cited by examiner

| Model ID | Model property | Model property | Model property | Model property | Model property |
|----------|----------------|----------------|----------------|----------------|----------------|
| 1 | | | | | |
| 2 | | | | | |
| 3 | | | | | |

FIG. 5

METHOD AND SYSTEM TO MODEL INDUSTRIAL ASSETS USING HETEROGENOUS DATA SOURCES

BACKGROUND

Industrial assets are engineered to perform particular tasks as part of industrial processes. For example, industrial assets can include, among other things and without limitation, generators, gas turbines, power plants, manufacturing equipment on a production line, aircraft engines, wind turbines that generate electricity on a wind farm, power plants, locomotives, healthcare or imaging devices (e.g., X-ray or MRI systems) for use in patient care facilities, or drilling equipment for use in mining operations. The design and implementation of these assets often takes into account both the physics of the task at hand, as well as the environment in which such assets are configured to operate and the specific modes these systems are required to operate in.

Industries typically try to model their assets performance as well as conduct prognostics and health management (PHM) tasks for various business needs to better service their customers. Typical PHM tasks include but are not limited to failure diagnostics/prognostics, anomaly detection, remaining useful life estimation, and root cause analysis. PHM tasks together with asset performance modeling are of core values to industrial assets thus the accuracy of models matter significantly.

In conventional systems, analytics tasks, such as, but not limited to, performance modeling and PHM tasks are carried out using actual historical data associated with the particular asset. However, sparse data assets, such as, but not limited to, assets recently brought online, assets that have undergone recent maintenance events, assets that have received software updates, or assets that are being operated in a different way in response to market conditions do not have enough history to accurately model those tasks. Therefore, it would be desirable to provide systems and methods to improve predictions associated with sparse data industrial assets. A "sparse data asset" may refer to any one of the above situations where an asset's past operating data may not be sufficient to produce accurate models for analytics tasks of interest.

SUMMARY

Some embodiments described herein relate to a system and method for combining relevant data with a data-driven approach to improve modelling of industrial assets. The method may comprise receiving relevant data associated with a sparse data asset, receiving operational data associated with the sparse data asset and creating a transfer model based on the relevant data and the received operational data. An input into the transfer model may be received and a predication based on data associated with the received operational data and the relevant data may be output.

A technical advantage of some embodiments disclosed herein are improved systems and methods for the early alerting of potential problems associated with an asset, such as potential failures which may cause damage to the asset or its surroundings, operational costs, and fuel related issues by having more accurate models available.

BRIEF DESCRIPTION OF THE DRAWINGS

FIG. 5 illustrates a portion of a database according to some embodiments.

DETAILED DESCRIPTION

Figure 1:
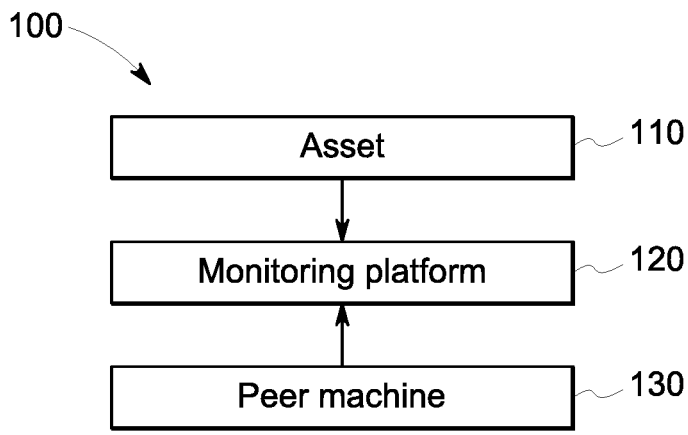
FIG. 1 is an overview of an asset monitoring system in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments described herein relate to a novel system and method to model a newly deployed asset using both relevant data as well as asset specific operation data. In some embodiments, the present embodiments relate to a highly accurate modeling system that may not be aware of an underlying physical mechanism that leads to performance fluctuation but instead may utilize a generic framework that is highly accurate in alerting an operator of the fluctuation. For example, a status and/or efficiency of a physical asset may be impacted by regular maintenance events, system degradation, or operational mode and it may be difficult for an operator to predict or understand an impact on the asset in terms of failures or potential failures that may arise and (i) may cause damage to the asset or its surroundings (e.g., fire, burst pipes, etc.), (ii) create increases in operational cost and/or (iii) create increases in an amount of fuel needed to operate the asset.

The use of a physics model has been the traditional approach for the design of assets, such as, but not limited to, power plants. A physics model may be defined as a model that comprises all the relevant physical parameters needed to simulate behavior of a specific asset. Such models are usually complex and utilize iterative calculations that may fail to converge when run at off-design conditions. In addition, physics models of assets such as power plants typically contain hundreds of parameters (e.g., geometric quantities and experimental data); these must be calibrated to the specific asset across its operating range. For these reasons, creating and running the physics model for performing analytics tasks is often an expensive, manual and time-consuming process and does not scale well to large numbers of assets. Conversely, purely data-driven approaches could be envisioned as an alternative to physics models because a data-driven approach has an advantage regarding scalability. However, while data-driven methods may solve some drawbacks of using a physics model, they require an initial data collection period and thus are not able to model unseen operation modes (e.g., unseen weather conditions, unseen operational conditions, etc.)

Relevant data associated with a sparse data asset may comprise one or more of (i) simulation data, (ii) a physics model associated with a peer asset, and (iii) operational data associated with a peer asset. The present embodiments relate to creating transfer models that are based on a combination of relevant data along with a data-driven approach to build more accurate transfer models, as well as a complementary system that leverages both system's advantages and avoid each system's drawbacks. However, the methods described herein may be generalized to any situation where there are two or more sources of asset data, each of which is not comprehensive in itself, but which in combination may accurately characterize an asset for performing analytics tasks across a range of operating conditions. The present embodiments may improve determining a useful life estimation associated with an asset, failure prognostics and diagnostics, and anomaly detection.

Since building and running a physics model is time-consuming, the present embodiments relate to utilizing (i) a surrogate model that was generated offline from a previous physics model or (ii) a generic physics model instead of a plant-specific calibrated model. Using an already available physics model for a similar asset, or using one based on generic parameters, eliminates the requirement to build a plant-specific physics model and as such reduces the recurring cost and time of creating a model.

Now referring to FIG. 1, an embodiment of a system 100 is illustrated. As illustrated in FIG. 1, the system 100 comprises an asset 110 and a monitoring platform 120. The asset 110 may comprise a sparse data asset. The asset 110 may comprise any industrial asset such as, and without limitation, a generator, a gas turbine, a power plant, manufacturing equipment on a production line, an aircraft engine, a wind turbines that generates electricity on a wind farm, a power plant, a locomotive, a healthcare or imaging device (e.g., X-ray or MRI system) for use in patient care facilities, or drilling equipment for use in mining operations. The monitoring platform 120 may receive operational data from the asset 110 and, in some embodiments, may also receive relevant data from a peer asset 130 via a network. The monitoring platform may (i) receive the operational data from the asset 110 and (ii) develop a transfer model associated with the asset 110 based on data received from the asset 110 as well as relevant data where the relevant data relevant is based on generic simulation data or based on a physics model from the peer asset 130. For example, simulation data may be generated for each valid operation mode (e.g., operation modes associated with specific conditions), and the simulation data may cover a broad range of conditions with high resolution such as weather conditions or any other condition that will affect an outcome of analytics tasks associated with the asset. The process of modeling will now be described in more detail with respect to FIG. 2.

Figure 2:
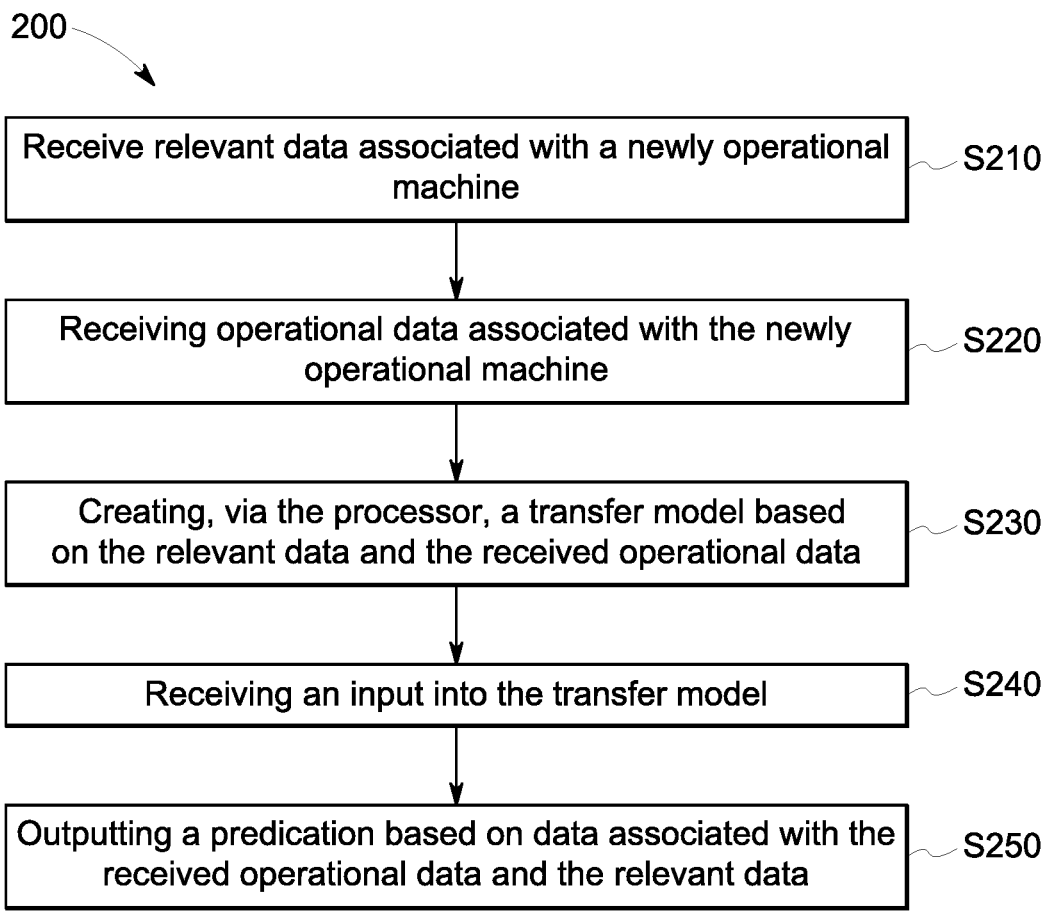
FIG. 2 illustrates a method in accordance with some embodiments.

According to some embodiments, FIG. 2 illustrates a method 200 that might be performed by the monitoring platform 120 of the system 100 described above respect to FIG. 1. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by an asset result in performance according to any of the embodiments described herein.

At S210, relevant data associated with a sparse data asset is received. In some embodiments, the relevant data may comprise non-asset specific simulation data. For example, the simulation data may comprise generic asset data that may be based on a plurality of known assets by averaging data across the plurality of known assets. In some embodiments, instead of being based on simulation data, the relevant data may be based on an existing physics model associated with a peer asset that is currently in operation. The selection of the existing physics model associated with the peer asset may be based on determining a similarity of the sparse data asset and the peer asset. For example, the sparse data asset and the peer asset may comprise similar components or may have been manufactured at a same factory within a narrow window of time (e.g., a few months). In another embodiment, the relevant data may be based on operational data associated with the peer asset or non-asset specific operational data.

For purposes of illustrating features of the present embodiments, some simple examples will now be introduced and referenced throughout the disclosure. Those skilled in the art will recognize that these examples are illustrative and are not limiting and are provided purely for explanatory purposes.

In a first example, a new power plant of type X (e.g., a gas turbine power plant) is being brought online and the plant operators wish to create a model for performing analytics tasks associated with the new power plant because an accurate transfer model is of great business value and even if the model accuracy is off by 1% in regard to an outcome of analytics tasks associated with the asset, this error may reflect a loss of millions of dollars in revenue. In this first example, the plant operator may use a physical model that comprises simulation data that is typical for a type X power plant but the simulation data is not based on any particular type X power plant. Instead, the simulation data may be simulation data that is used during a design of type X power plants or for testing type X power plants prior to operation.

In a second example, a new power plant of type Y (e.g., a nuclear power plant) is being brought online and the plant operators wish to create a model for performing analytics tasks associated with the new power plant. In this second example, the plant operator may use a physical model from a peer power plant (i.e. another type Y power plant) that is currently in use and similar in configuration to the new power plant. The physical model from the peer power plant may be loaded from a storage medium, downloaded via a network connection, or remotely accessed over a network (e.g., a LAN, MAN, or WAN) between the two power plants (e.g., a network connection between respective modeling platforms).

At S220, operational data associated with the sparse data asset is received. Once the sparse data asset is in operation (e.g., performing its intended function), data associated with the operation of the sparse data asset may be received at a monitoring platform and the received data may be used to create a transfer model.

Continuing with the first example, data associated with the operation of the power plant of type X (e.g., a gas turbine power plant) may be received at the monitoring platform. The data may be associated with internal operating conditions (e.g., temperature, fuel consumption, etc.) as well as external environmental conditions (e.g., temperature, humidity, demand on the plant, etc.).

Continuing with the second example, data associated with the operation of the power plant of type Y (e.g., a nuclear power plant) may be received at the monitoring platform. The data may be associated with internal operating conditions (e.g., temperature, water intake for cooling, etc.) as well as external environmental conditions (e.g., temperature, humidity, demand, etc.).

At S230, a transfer model based on the relevant data and the received operational data may be created. The transfer model may comprise a first transfer model for the newly operational plant that is based on the initial physics model and the initial received operational data. It is important to note that the initial operational data may not be related to each and every situation that the asset may encounter over its lifetime and thus actual asset data for certain environments or situations may not be available as received operational data.

Creation of a transfer model comprises the transfer of knowledge from a first data set to a second data set based on similarities of the data sets and/or similarities of physical structures that are described by the data sets. In some embodiments, this may be priors and/or features learnt from the first data set; In some embodiments, the creation of a transfer model may leverage existing data from a secondary data source by first creating a prediction model based on the existing data, then borrow the model structures, model parameters and/or even model itself; In some embodiments, one can build joint models to explicitly model similarities between input/output distributions. An example of the last scenario will be further described with respect to FIG. 3.

Continuing with the first example, a transfer model regarding the operation of the power plant of type X may be created. Continuing with the second example, a transfer model regarding the operation of the power plant of type Y may be created.

At S240, an input into the transfer model is received. The input may be associated with an operating condition or a potential operating condition in which the asset may have to operate. For example, a severe weather change may be forecast and an operator may need to prepare the plant for such a weather change by having enough fuel or cooling capacity available to meet a forecasted demand on the asset.

Continuing with the above examples, an operator may receive a weather forecast indicating very cold weather over a three-week period and the operator may enter a temperature condition (e.g., −5 Celsius) into the model associated with power plant of type X to estimate an amount of fuel to purchase prior to the three-week period to ensure that operation of the plant can meet the forecasted demand and to be able to purchase fuel at a volume discount. Similarly, an operator may receive a report indicating that water used to cool a power plant of type Y (e.g., sea water, river water, etc.) will be increasing in temperature over a two-month period and the operator may enter water conditions (e.g., temperature) into the model associated with power plant of type Y to estimate an amount of use that water pumps will be required to run to ensure proper cooling of the plant so that the power plant does not overheat. Since water pumps may be needed to run for a higher percentage of time with warmer water, the operator may need to ensure that water pumps won't burn out after being run for prolonged periods of time.

At S250, a predication based on data associated with the received operational data and the relevant data is output. Continuing again with the above examples, in response to inputting the temperature condition into the model associated with power plant of type X, the operator may receive an estimated amount of fuel to purchase over the next three-week period. Similarly, in response to inputting the water conditions into the model associated with power plant of type Y, the operator may receive an estimated amount of use that pumps will be required to run to ensure proper cooling of the plant so that the power plant does not overheat.

In some embodiments, an asset may be automatically operated in accordance with the predication based on data associated with received operational data and the relevant data. For example, each asset may receive the predication as a series of parameters which are input into the asset and in response to the received parameters, the asset may automatically adjust operational settings based on the received parameters.

Figure 3:
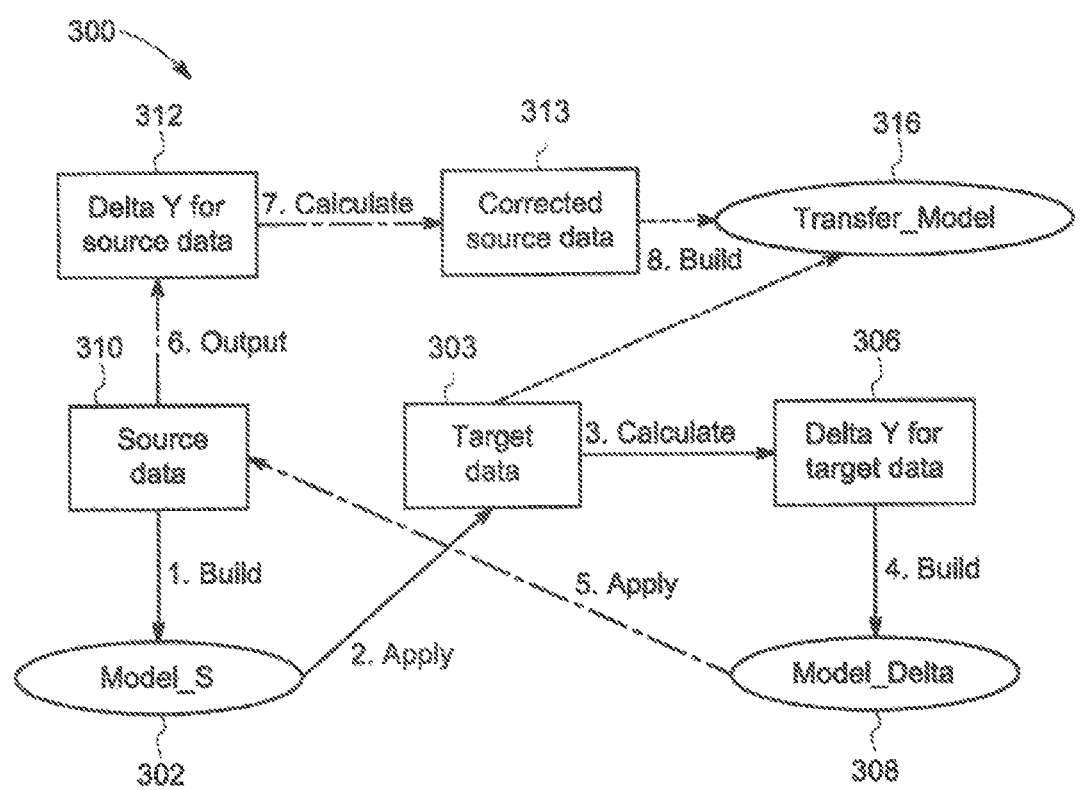
FIG. 3 illustrates a process according to some embodiments.

Now referring FIG. 3, an embodiment of a process flow 300 is illustrated. The process flow 300 may illustrate a process for creating a transfer model. In some embodiments, process flow 300 may illustrate a transfer leaning algorithm for creating a transfer model. At 302, a prediction model may be created and the prediction model 302 may be loaded with source data 310. For example, the source data 310 may comprise simulation data or data from a peer physics model. The prediction model 302 may apply its logic/knowledge to create target data 303. At 306, an error between the target data and the actual data may be calculated and may be used to create an error score 308 associated with the target data. The error score may be applied to the source data 310 and an error score 312 associated with the source data 310 may be output. The error score 312 may be used to calculate corrected source data 313 which may be used to build a transfer model 316.

Figure 4:
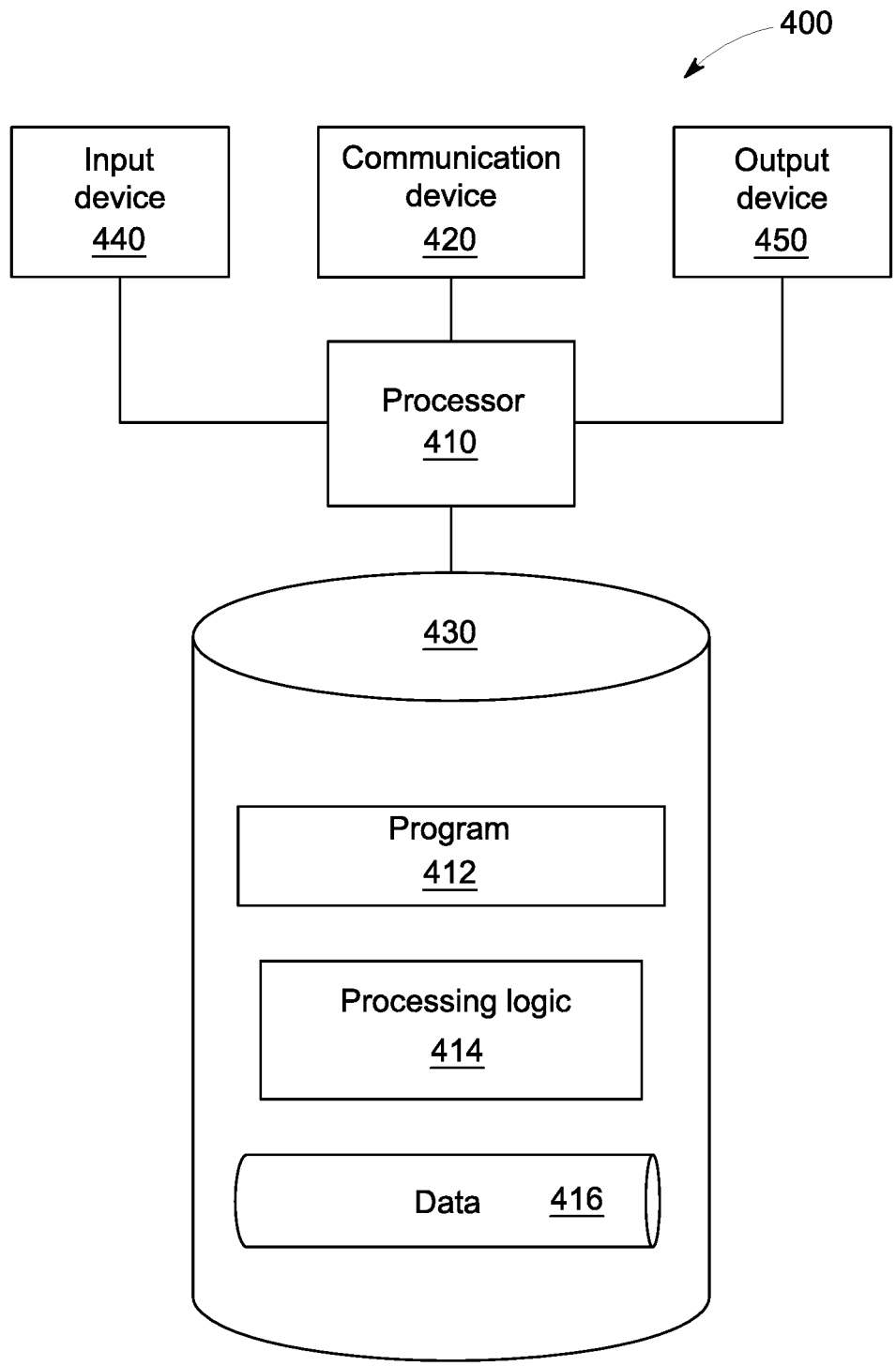
FIG. 4 illustrates a process according to some embodiments.

Note the embodiments described herein may be implemented using any number of different hardware configurations. For example, FIG. 4 illustrates a monitoring platform 400 that may be, for example, associated with the system 100 of FIG. 1. The monitoring platform 400 may provide a technical and commercial advantage by creating a prediction tool, that causes minimal changes to existing plant digital control systems and that is field deployable on existing assets. Furthermore, the monitoring platform 400 may provide advisory alerts based on predictions regarding potential or eminent failures.

The monitoring platform 400 may comprise a processor 410 ("processor"), such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more users. The monitoring platform 400 may further include an input device 440 (e.g., a mouse and/or keyboard to enter information about the asset) and an output device 450 (e.g., to output and display the data and/or alerts).

The processor 410 also communicates with a memory/storage device 430 that stores data 416. The storage device 430 may comprise any appropriate information storage device, including combinations of magnetic storage devices (e.g., a hard disk drive), optical storage devices, mobile telephones, and/or semiconductor memory devices. The storage device 430 may store a program 412 and/or processing logic 414 for controlling the processor 410. The processor 410 performs instructions of the programs 412, 414, and thereby operates in accordance with any of the embodiments described herein. For example, the processor 410 may receive data such as, but not limited to, sensor data or data from a repository and may create a model based on the data via the instructions of the programs 412 and processing logic 414.

The programs 412, 414 may be stored in a compiled, compressed, uncompiled and/or encrypted format or a combination. The programs 412, 414 may furthermore include other program elements, such as an operating system, a database management system, and/or device drivers used by the processor 410 to interface with peripheral devices.

Figure 5:
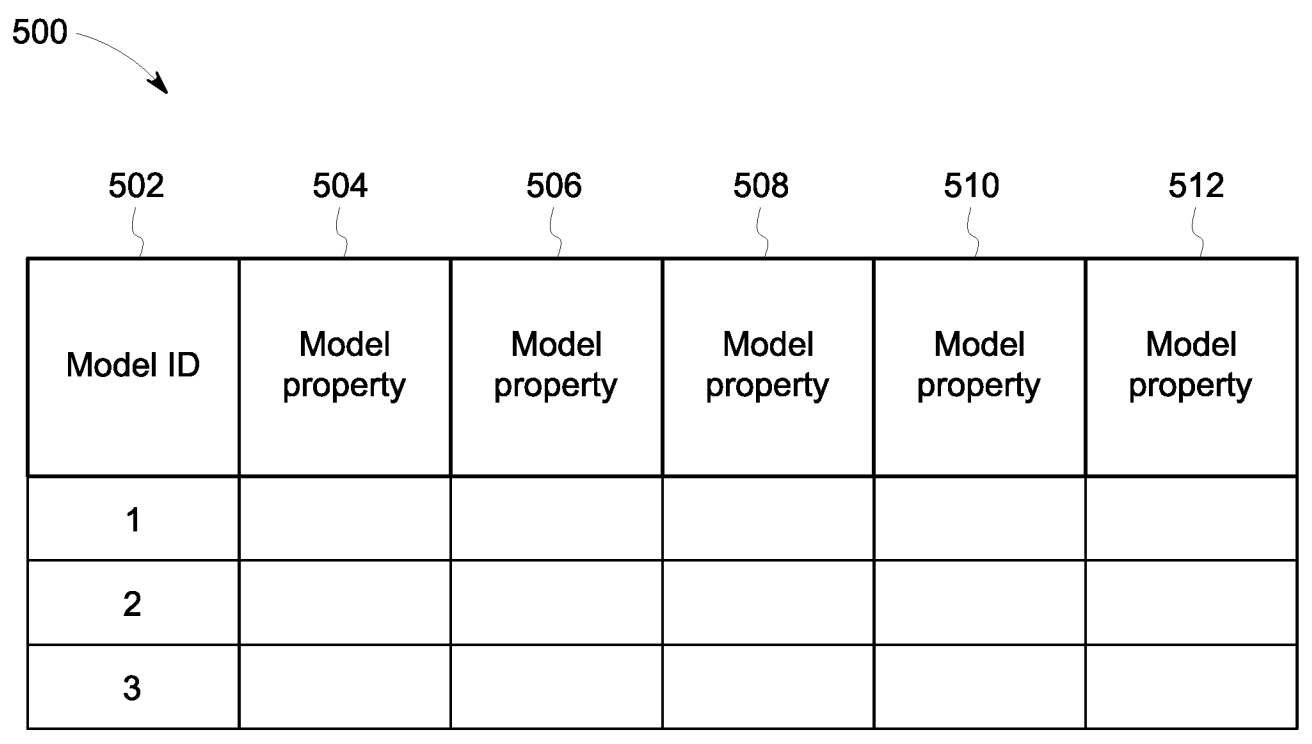

FIG. 5 is a tabular view of a portion of a database 500 in accordance with some embodiments of the present invention. The table includes entries associated with model related properties such as, but not limited to, model name, model creation date, confidence score, and accuracy score. The table also defines fields 502, 504, 506, 508, 510, 512, 514 and 516 for each of the entries. The fields, for example, may specify: a model ID 502, a first model property 504, a second model property 506, a third model property 507, a fourth model property 510, an nth material related property 512. The information in the database 500 may be periodically created and updated based on information collection during operation of a boiler and as they are received from one or more sensors.

The model ID 502 might be a unique alphanumeric code identifying a specific model of a plurality of models and the properties 504/506/508/510/512/514/516 might provide information related to features associated with a specific model such as a model name, a model creation date, a confidence score, and an accuracy score.

As used herein, information may be "received" by or "transmitted" to, for example: (i) the monitoring platform 120 from another device; or (ii) a software application or module within the monitoring platform 120 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The process flow and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A system to model a sparse data asset, the system comprising:
    a processor; and
    a non-transitory computer-readable medium comprising instructions that when executed by the processor perform a method to model a sparse data asset, the instructions to:
        receive relevant data associated with the sparse data asset, wherein the relevant data is a physics model associated with a peer asset currently in operation;
        receive operational data associated with the sparse data asset;
        create, via the processor, a transfer model based on the relevant data and the received operational data, wherein the creating of the transfer model comprises:
            creating an initial model based on the received relevant data;
            applying the initial model to received operational data;
            determining an error rate associated with target data;
            creating a second model based on the error rate associated with the target data;
            determining output data of the second model as second source data;
            determining a second error rate for the second source data as corrected source data; and
            creating the transfer model based on the corrected source data;
        receive an input into the transfer model; and output a predication based on the input, data associated with the received operational data, and the relevant data.

2. The system of claim 1, wherein the relevant data comprises non-asset specific simulation data or operation data from peer assets.

3. The system of claim 1, wherein the relevant data is determined based on a specific analytics task of interest.

4. The system of claim 1, wherein the peer asset is connected to the sparse data asset via a network for transmitting the relevant data.

5. A non-transitory computer-readable medium comprising instructions that when executed by the processor perform a method to model a sparse data asset, the method comprising:
 receiving relevant data associated with the sparse data asset, wherein the relevant data is a physics model associated with a peer asset currently in operation;
 receiving operational data associated with the asset;
 creating, via a processor, a transfer model based on the relevant data and the received operational data, wherein the creating of the transfer model comprises:
  creating an initial model based on received source data from the relevant data;
  applying the initial model to received operational data;
  determining an error rate associated with target data;
  creating a second model based on the error rate associated with the target data;
  determining output data of the second model as second source data;
  determining a second error rate for the second source data as corrected source data; and
  creating the transfer model based on the corrected source data;
 receiving an input into the transfer model; and
 outputting a predication based on the input, data associated with the received operational data, and the relevant data.

6. The non-transitory computer-readable medium of claim 5, wherein the relevant data comprises non-asset specific simulation or operation data.

7. The non-transitory computer-readable medium of claim 5, wherein the relevant data is determined based on a specific analytics task of interest.

8. The non-transitory computer-readable medium of claim 5, wherein the peer asset is connected to the sparse data asset via a network for transmitting the relevant data.

9. A method to model a sparse data asset, the method comprising:
 receiving relevant data associated with the sparse data asset, wherein the relevant data is a physics model associated with a peer asset currently in operation;
 receiving operational data associated with the asset;
 creating, via a processor, a transfer model based on the relevant data and the received operational data, wherein the creating of the transfer model comprises:
  creating an initial model based on received source data from the relevant data;
  applying the initial model to received operational data;
  determining an error rate associated with target data;
  creating a second model based on the error rate associated with the target data;
  determining output data of the second model as second source data;
  determining a second error rate for the second source data as corrected source data; and
  creating the transfer model based on the corrected source data;
 receiving an input into the transfer model; and
 outputting a predication based on the input, data associated with the received operational data, and the relevant data.

10. The method of claim 9, wherein the relevant data comprises non-asset specific simulation or operation data.

11. The method of claim 9, wherein the relevant data is determined based on a specific analytics task of interest.

12. The method of claim 9, wherein the peer asset is connected to the sparse data asset via a network for transmitting the relevant data.

\* \* \* \* \*